April 12, 1949.  P. L. MIKESKA  2,467,217
HOT WATER AUTOMATIC VENT VALVE
Filed Oct. 23, 1947
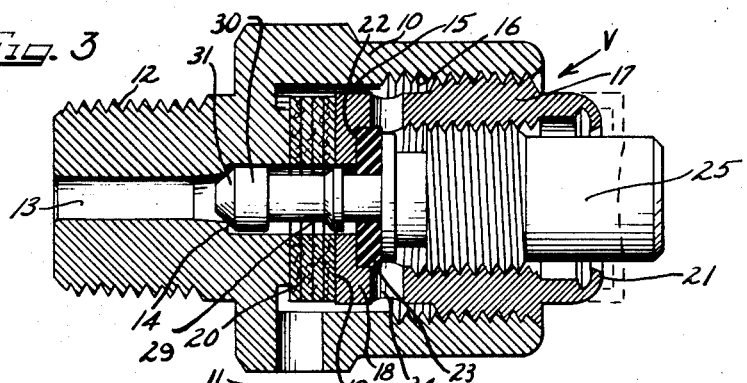
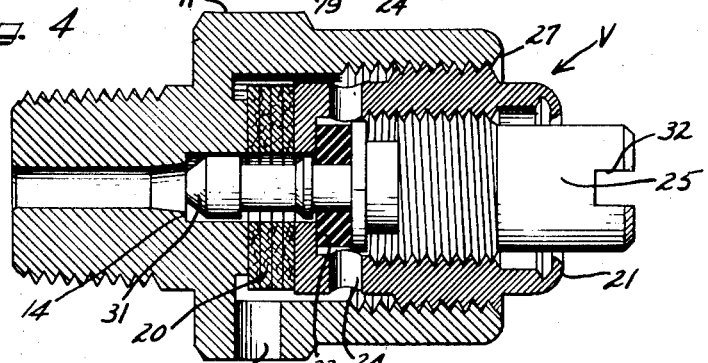
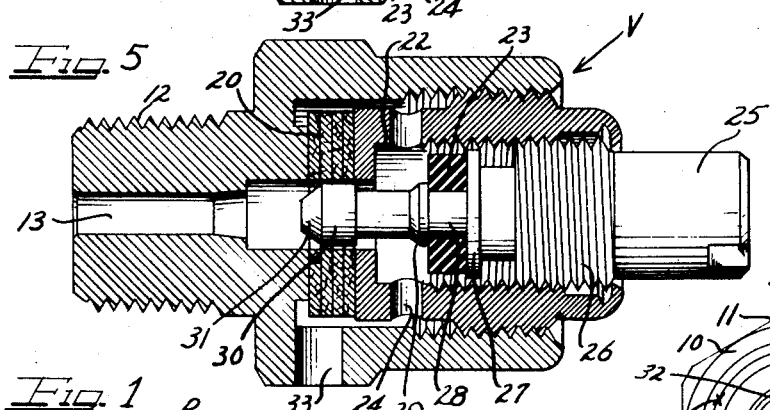
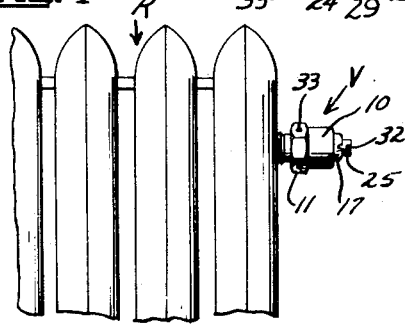
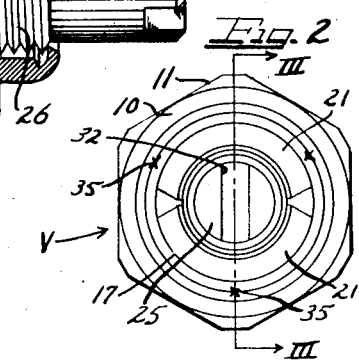
Inventor
PETER L. MIKESKA
by The Firm of Charles W. Hills Attys.

Patented Apr. 12, 1949

2,467,217

UNITED STATES PATENT OFFICE 2,467,217

HOT-WATER AUTOMATIC VENT VALVE

Peter Lawrence Mikeska, Chicago, Ill., assignor to The Dole Valve Company, Chicago, Ill., a corporation of Illinois Application October 23, 1947, Serial No. 781,667

6 Claims. (Cl. 137—122)

This invention relates to a valve and more particularly to a vent valve especially adapted for use in venting air from a radiator of a hot water heating system.

An object of this invention is to provide an air vent valve which is economical to manufacture on a large production basis and which will, in use, efficiently and automatically vent the gas or air under the previously adjusted condition of the vent valve.

Another object of this invention is to provide a vent valve which, in use, will automatically vent air without permitting the passage of any substantial amount of liquid or water through the valve, and which in the event of failure can be quickly adjusted manually to shut off any flow of fluid therethrough.

Still another object of the invention is to provide a valve which is adjusted to permit a normal amount of automatic venting of air but which can be manually adjusted easily and quickly to provide for a greater amount of venting as in the case where a hot water heating system is being refilled with water after it has been drained.

Yet another object of the invention is to provide a vent valve with an emergency shut-off valve pin, which can be utilized in facilitating the assembling of the parts of the valve and in the adjustment of the valve during ageing of the same at the factory.

An additional object of the invention is to provide a vent valve having both a sealing ring for establishing an internal seal between the parts of the valve and hygroscopic washer means capable of permitting the flow of gas or air therethrough while resisting the passage of liquid in the normal use of the valve.

In accordance with the general features of this invention there is provided an air vent valve, including a tubular body having an inlet and an outlet, relatively adjustable concentric sleeve and valve stem members adjustably secured in the body, a resilient seal ring between said members forced into sealing position by the stem member and fluid flow control washer means seated in said body at the inlet opening and adjustably held in position by the sleeve member, the washer means defining within itself a gas flow path therein but in normal usage of the valve resisting the flow of liquid or water therethrough from the inlet.

Another feature of the invention relates to the stem member of the aforesaid valve being provided with an extremity projecting through the sealing ring and washers, and formed into a valve element cooperable with the edge of the inlet opening inside of the valve body for completely closing the valve when desired, as for example, if and when a leakage of water through the valve occurs.

Other objects and features of this invention will more fully appear from the following detailed description taken in connection with the accompanying drawing which illustrates a single embodiment thereof, and in which Figure 1 is a fragmentary side view of a hot water radiator showing my novel vent valve applied thereto;

Figure 2 is an enlarged end view taken from the right hand side of the vent valve shown in Figure 1;

Figure 3 is a vertical cross sectional view taken on substantially the line III—III of Figure 2 looking in the direction indicated by the arrows and showing the valve in a completely closed position, the dotted lines showing the position of the outer end of the sleeve prior to the crimping of the same in adjusted or set position at the factory.

Figure 4 is a sectional view similar to Figure 3 but showing the valve stem backed away from the valve seat so that the valve is in a normal air venting position; and Figure 5 is a sectional view similar to Figures 3 and 4 showing how the valve stem can be moved still further away from the seat to break the seal and permit of a quicker venting of air as when the radiators are being refilled with water after draining.

As shown on the drawing:

In the accompanying drawing the reference character V designates generally the vent valve of my invention, and which is shown in Figure 1 as being applied in the usual way to the radiator R of a conventional hot water heating system.

At the outset, it should be observed that the metal parts of the vent valve are of such mechanical structure that they may be economically made on a large production basis as, for example, on automatic screw machines and the like.

This valve includes an outer tubular metal body 10 having an intermediate wrench engaging portion 11 and a nipple 12 for screwing into the radiator opening. This nipple 12 defines at its center an inlet opening or passage 13 leading to a valve seat or edge 14 inside of the body 10. To the right of this edge 14, the body 10 has an enlarged bore 15 leading into an internally threaded portion 16 into which is threaded a metal sleeve member 17 embodying features of this invention. This sleeve 17 has its internal end flanged at 18 into a shoulder 19 for engaging endwise a series of washers 20 axially aligned with the inlet opening 13.

These washers may be of any suitable number although I have illustrated them as being four in number. They are identical in construction and are each made of a hygroscopic material such as a fibre capable of expanding to a considerable extent when immersed in water at room temperature and capable of contracting when dried. For illustration, the material used may be such that each washer can expand to an extent of, say, about 30% of its original thickness when immersed in water at room temperature for approximately an hour. Similarly when dried at room temperature for a period of approximately one hour the material is capable of returning to within a small amount, such for example, as 5% of its original thickness.

At present I am using unglazed, uncalendered vulcanized fibre that is available on the market.

The sleeve 17 also has outer reduced flange portions 21 which, after the assembling of the parts of the valve, are adapted to be crimped from the dotted line position to the full line position shown in Figure 3, as will be described more in detail hereinafter.

In addition, the flange end or head 18 of this sleeve has a shouldered portion 22 on which is seated a resilient or rubber-like sealing ring 23. Adjacent this sealing ring the wall of the sleeve 17 is provided with a plurality of transverse or laterally extending openings 24 for allowing fluid to escape rapidly from the valve when the rubber washer or sealing ring is unseated as shown in Figure 5.

Now disposed centrally of the sleeve 17 is a pin or stem member designated generally by the reference character 25. This stem member includes a threaded portion 26 and an integral reduced shoulder flange 27 for abutting endwise a side surface of the rubber ring 23 to press it against the shouldered portion 22 of the sleeve for compressing the rubber from the condition shown in Figure 5 to the position shown in Figures 3 and 4 in which the ring is flattened into sealing position. The purpose of this ring is to establish a seal between the sleeve and the stem member 25 in the normal use of the vent valve.

Extending from the flange 27 is a reduced pin portion 28 over which the gasket 23 is snugly fitted. It should be noted that the gasket is held on this portion 28 by a slight enlargement 29 formed on the valve stem and over which the gasket can be stretched to dispose it between the shoulder 27 and the small abutment or enlargement 29.

The innermost extremity of the pin member is formed into a valve element 30, which is machined on a taper at 31 so as to enable it to seat on the valve edge opening 14 when the valve is closed, as shown in Figure 3.

In addition, the outermost extremity of the valve pin or stem member 25 is provided with a screwdriver slot 32 in which the end of a suitable tool or coin may be inserted for manually turning and adjusting the position of the valve stem.

The valve body 10 is provided with a plurality of lateral outlet openings 33 which may be of any suitable number, such, for example, as three. These openings are disposed opposite the hygroscopic washers 20 so as to readily receive any air vented through these washers from the inlet opening 13 in the normal operation of the valve.

In the assembling of the device the fiber washers 20 are placed inside of the valve body 10. The sleeve 17 is tightened in position by a suitable torque tool until 1 lb.-inch is applied. Then the sleeve is backed or turned in the reverse direction approximately 5 angular degrees. This procedure results in having all the valves made with uniform factory setting.

When the sleeve 17 is in this position it is staked to the valve body 10 at say 3 points as indicated at 35 in Fig. 2. This results in the sleeve being peened or tightly keyed to the valve body in the adjusted position.

Before the valve pin 25 is assembled in the sleeve, the rubber ring or washer 23 is stretched over the reduced end of the valve pin until it is in position against the shoulder 27. Thereafter the valve pin or stem 25 is screwed into the sleeve and as it is screwed in the bevelled extremity 31 enters and passes through the openings in the fiber washers 20. Also this action brings the rubber ring 23 against its seat 22 in the sleeve 17.

After the assembling of the valve stem in the sleeve, the flange portions 21 of the sleeve are crimped inwardly as shown in Figures 3 and 5. This crimping serves to prevent the stem 25 from being completely removed from the sleeve when it is turned outwardly.

The stem or pin is then turned to a completely closed position as shown in Figure 3. In the course of this action, the rubber seal ring 23 is displaced into tight sealing position. Thereafter the stem is backed off about one-quarter of a revolution to a position shown in Figure 4, in which the bevelled end 31 of the valve is removed from the opening edge 14, thus opening the valve.

In practice I find that in making this valve it is desirable to then bake the assembly in an oven at 240° F. for 48 hours with the valve open approximately ¼ revolution so as to pre-age the rubber seal ring 23. After the valve cools it is tested for water leakage at 60 p. s. i. gauge pressure. If no leaks are present it is released for shipment.

Thus the valve is furnished to the user or customer in the condition shown in Figure 4. After installation on a radiator if any leaks develop the valve has an emergency feature in that by turning the stem 25 it is possible to close the valve as shown in Figure 3. Normally, however, the valve is in the condition shown in Figure 4; but, as pointed out before, if the radiators have been drained and are being refilled it becomes desirable to more quickly vent the radiators. In that event each vent may be further opened as shown in Figure 5 unseating the rubber ring 23 and permitting the air to flow through the center of the fibre washers into the interior of the sleeve 17, through the lateral openings 24 to the outlets 33.

I claim as my invention:

1. In an air vent valve including a tubular body having an inlet and an outlet, hygroscopic washers seated in said body in alignment with and around the inlet opening, a sleeve adjustably secured in said body and bearing endwise against said washers to confine the same in position and so as to prevent substantial passage of liquid from said inlet through said washers while permitting the escape of gas from the inlet through said washers into said body and to said outlet, and a valve pin including a stem threaded in said sleeve, said pin having an extremity formed into a valve element and extending through said washers for engaging with the edge of said inlet opening to close the same upon manipulation of said pin, and a resilient seal washer about said stem and in sealing engagement with an inner end of said sleeve adjacent said washers and movable into sealing position by threading of said pin in said sleeve.

2. In an air vent valve including a tubular body having an inlet and an outlet, relatively adjustable concentric sleeve and valve stem members adjustably secured in said body, a resilient seal ring between said members forced into sealing position with said sleeve by the rotation of stem member in said sleeve and fluid flow control hygroscopic washer means seated in said body at the inlet opening and adjustably held in position by said sleeve member, said washer means defining within itself a gas flow path therein but preventing the flow of liquid therethrough from the inlet.

3. In an air vent valve including a tubular body having an inlet and an outlet, relatively adjustable concentric sleeve and valve stem members threaded one within the other in said body, a resilient seal ring between said members forced into sealing position with said sleeve by relative adjustment of said stem and sleeve members and fluid flow hygroscopic control washer means seated in said body at the inlet opening and adjustably held in position by said sleeve member, said washer means defining within itself a gas flow path therein but preventing the flow of liquid therethrough from the inlet, said stem member having an extremity projecting through said ring and washers and formed into a valve element cooperable with the edge of the inlet opening inside said body.

4. In an air vent valve including a tubular body having an inlet and an outlet, relatively adjustable concentric sleeve and valve stem members threaded one within the other in said body, a resilient seal ring between said members forced into sealing position with said sleeve by relative adjustment of said stem and sleeve members and fluid flow control hygroscopic washer means seated in said body at the inlet opening and adjustably held in position by said sleeve member, said washer means defining within itself a gas flow path therein but preventing the flow of liquid therethrough from the inlet, said stem member having an extremity projecting through said ring and washers and formed into a valve element cooperable with the edge of the inlet opening inside said body and said valve element including a frusto-conical surface axially aligned with said opening edge and movable into engagement with same for closing the valve.

5. In a gas vent valve including a tubular body having an inlet and an outlet, hygroscopic means seated in said body directly at the inlet opening into the body and defining within itself a gas path through which gas from the inlet can flow to reach said outlet, said means preventing the flow of liquid therethrough from said inlet, and sealed adjustable means in said body for retaining said hygroscopic means in gas venting position, said adjustable means including a part accessible from the exterior of the body to break the seal and bypass liquid around the hygroscopic means from said inlet to said outlet.

6. In a gas vent valve including a tubular body having an inlet and an outlet, hygroscopic means seated in said body directly at the inlet opening into the body and defining within itself a gas path through which gas from the inlet can flow to reach said outlet, said means preventing the flow of liquid therethrough from said inlet, and sealed adjustable means in said body for retaining said hygroscopic means in gas venting position, said adjustable means including a part accessible from the exterior of the body to break the seal and bypass liquid around the hygroscopic means from said inlet to said outlet and a second part surrounding the first-mentioned part and bearing against the hygroscopic means.

PETER LAWRENCE MIKESKA.

REFERENCES CITED

The following references are of record in the file of this patent:

UNITED STATES PATENTS

| Number | Name | Date |
|---|---|---|
| 1,575,247 | Anderson | Mar. 2, 1926 |
| 2,153,726 | Scoppola | Apr. 11, 1939 |
| 2,314,963 | Zelmis | Mar. 30, 1943 |
| 2,331,431 | Simoneau | Oct. 12, 1943 |